US010470102B2

(12) United States Patent
Keidar et al.

(10) Patent No.: US 10,470,102 B2
(45) Date of Patent: *Nov. 5, 2019

(54) MAC ADDRESS-BOUND WLAN PASSWORD

(71) Applicant: ZitoVault, Inc., Carlsbad, CA (US)

(72) Inventors: Ron Keidar, San Diego, CA (US); Timothy McElwee, Escondido, CA (US)

(73) Assignee: ZITOVAULT, INC., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/081,521

(22) Filed: Mar. 25, 2016

(65) Prior Publication Data

US 2017/0238183 A1 Aug. 17, 2017

Related U.S. Application Data

(63) Continuation of application No. 15/046,299, filed on Feb. 17, 2016.

(51) Int. Cl.
*H04W 12/08* (2009.01)
*H04W 48/02* (2009.01)
(Continued)

(52) U.S. Cl.
CPC ......... *H04W 48/02* (2013.01); *H04L 63/0227* (2013.01); *H04L 63/062* (2013.01);
(Continued)

(58) Field of Classification Search
CPC ..... H04W 12/08; H04W 12/04; H04W 84/12; H04L 63/062; H04L 63/087; H04L 63/0823
See application file for complete search history.

(56) References Cited

U.S. PATENT DOCUMENTS 8,594,628 B1 11/2013 Schroeder
9,565,192 B2 * 2/2017 Chillappa ............. H04L 63/102
(Continued)

FOREIGN PATENT DOCUMENTS

CN 103873454 A 6/2014
CN 103974256 A 8/2014
(Continued)

OTHER PUBLICATIONS

How to Bind Ip Address and Mac Address on TP-link Router?; http://www.tp-link.com/en/faq-170.html; Apr. 12, 2016.
(Continued)

*Primary Examiner* — Vinncelas Louis
(74) *Attorney, Agent, or Firm* — Womble Bond Dickinson (US) LLP

(57) ABSTRACT

A router management server may be utilized to manage a plurality of home routers. Appropriate access control rules may be determined by the router management server for various client devices including IoT devices based on the type and/or make/model of the client devices. MAC address-bound WLAN passphrases may be assigned to the client devices and bound to the MAC addresses associated the client devices. Further, WLAN passphrases may be associated with expiration periods and/or access control rules. Therefore, a secure home network environment that takes into account the vulnerabilities of IoT devices may be achieved without the involvement of an IT department. Moreover, Flexibility of WLAN passphrase management may be improved.

19 Claims, 9 Drawing Sheets

(51) Int. Cl.
*H04L 29/06* (2006.01)
*H04W 12/04* (2009.01)
*H04W 84/12* (2009.01)

(52) U.S. Cl.
CPC ......... *H04L 63/0876* (2013.01); *H04W 12/04* (2013.01); *H04W 12/08* (2013.01); *H04W 84/12* (2013.01)

(56) References Cited

U.S. PATENT DOCUMENTS

| | | | |
|---|---|---|---|
| 9,686,289 B2 * | 6/2017 | Ernohazy | .............. H04L 63/102 |
| 2005/0021979 A1 | 1/2005 | Wiedmann et al. | |
| 2006/0274643 A1 | 12/2006 | Choyi et al. | |
| 2008/0263647 A1 | 10/2008 | Barnett et al. | |
| 2010/0313262 A1 * | 12/2010 | Mehta | ................ H04L 63/0823 |
| | | | 726/12 |
| 2012/0317625 A1 | 12/2012 | Jou et al. | |
| 2013/0095789 A1 * | 4/2013 | Keevill | ................ H04W 12/06 |
| | | | 455/411 |
| 2013/0309971 A1 | 11/2013 | Kiukkonen et al. | |
| 2014/0007209 A1 | 1/2014 | Zucker | |
| 2014/0031991 A1 | 1/2014 | Bergman et al. | |
| 2014/0196112 A1 * | 7/2014 | Huang | .................. G06F 1/1632 |
| | | | 726/3 |
| 2015/0230280 A1 * | 8/2015 | Dees | .................... H04W 76/023 |
| | | | 455/39 |
| 2015/0296377 A1 | 10/2015 | Sheu | |

FOREIGN PATENT DOCUMENTS

| | | |
|---|---|---|
| CN | 104580265 A | 4/2015 |
| CN | 105072617 A | 11/2015 |
| JP | 2007293868 A | 11/2007 |
| KR | 100737526 B1 | 7/2007 |
| WO | 2015/092484 A1 | 6/2015 |

OTHER PUBLICATIONS

Wireless Data Protection; http://wiki.mikrotik.com/wiki/Testwiki/Advanced_MikroTiki_Wireless_networks; Apr. 12, 2016.
"International Search Report and Written Opinion—PCT/US17/18740".

* cited by examiner

MAC ADDRESS-BOUND WLAN PASSWORD

CROSS REFERENCE TO RELATED APPLICATIONS

The present Application for Patent is a Continuation of patent application Ser. No. 15/046,299 entitled "WIRELESS ROUTER AND ROUTER MANAGEMENT SYSTEM," filed Feb. 17, 2016, now pending.

FIELD

The embodiments of the disclosure relate to electronic devices, and particularly, relate to cloud-managed wireless routers.

RELEVANT BACKGROUND

The Internet of Things (IoT) is the network of physical objects or "things" embedded with electronics, software, sensors, and network connectivity, which enables these objects to collect and exchange data. Example of IoT devices may include networkable ovens, light switches, light bulbs, coffeemakers, irrigation systems, thermostats, surveillance cameras, etc. The list is non-exhaustive and is still expanding. IoT devices are becoming ever more common inside people's homes.

Some IoT devices have poor security designs. They may have weakly protected processors, weak software implementation providing little or no security, or other security vulnerabilities. Hackers or malware may be able to easily exploit these poorly-secured IoT devices and use such IoT devices as bases from which attacks against other targets in the home network can be launched. As IoT devices may be trusted entities within a home network, hackers or malware may be able to hide behind the identity of trusted IoT devices and disguise themselves as also being trusted.

Home users do not always have the resources or knowledge to properly secure their home networks. Sophisticated solutions exist to help enterprise users manage their complex networks, but these solutions require the resources or knowledge of a dedicated information technology (IT) department, which may not be available to home users.

Wireless local area networks (WLANs) deployed within home networks may have a few well-known security issues. Wi-Fi Protected Access (WPA)-Personal (also known as WPA-pre-shared key, or WPA-PSK) or its equivalent for Wi-Fi Protected Access II (WPA2) (known as WPA2-Personal or WPA2-PSK) is the most common mechanism used to secure home WLANs. With standard WPA-Personal or WPA2-Personal, the same passphrase is shared with all client devices. Therefore, if one device is breached by a hacker or malware and the WLAN passphrase stored therein compromised, the hacker or the malware may connect to the home network via the WLAN connection while pretending to be a legitimate device on the home network, may eavesdrop on the communications of other devices, even if the communications are encrypted, or may impersonate another legitimate device. Furthermore, to change the passphrase of the WLAN, each and every device on the WLAN needs to be individually reconfigured with the new passphrase. Further still, a guest to the home may request the passphrase in order to temporarily utilize the host's WLAN connection. If the host user provides the guest with the WLAN passphrase, then the host user may lose control over the passphrase, which is shared across all devices on the WLAN.

Some of the drawbacks associated with WPA-Personal or WPA2-Personal as described above may be mitigated by an alternative known as WPA-Enterprise or WPA2-Enterprise. However, deployment of WPA-Enterprise or WPA2-Enterprise may be infeasible within a home WLAN as it may require the resources or knowledge of a dedicated IT department. Moreover, WPA-Enterprise or WPA2-Enterprise may require computational capabilities from client devices that may be unavailable on some IoT devices.

SUMMARY

Aspects may relate to a method for assigning a media access control (MAC) address-bound wireless local area network (WLAN) passphrase to a client device, comprising: detecting a connection attempt by the client device; determining a MAC address associated with the client device; determining a WLAN passphrase for the client device; and storing a combination of the WLAN passphrase and the MAC address associated with the client device, wherein the WLAN passphrase is bound to the MAC address.

Further aspects may relate to a method for verifying a media access control (MAC) address-bound wireless local area network (WLAN) passphrase, comprising: performing a handshake process with a client device, wherein a MAC address associated with the client device is determined based on the handshake process; determining a MAC address-bound WLAN passphrase for the client device based on the MAC address associated with the client device; determining whether the client device is in possession of the MAC address-bound WLAN passphrase for the client device based on the handshake process; and allowing the client device to join the WLAN in response to a determination that the client device is in possession of the MAC address-bound WLAN passphrase for the client device.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments. Embodiments of disclosure described herein may relate to functionality implemented across multiple devices. Obvious communications (e.g., transmissions and receipts of information) between the devices may have been omitted from the description in order not to obscure the disclosure.

Figure 1:
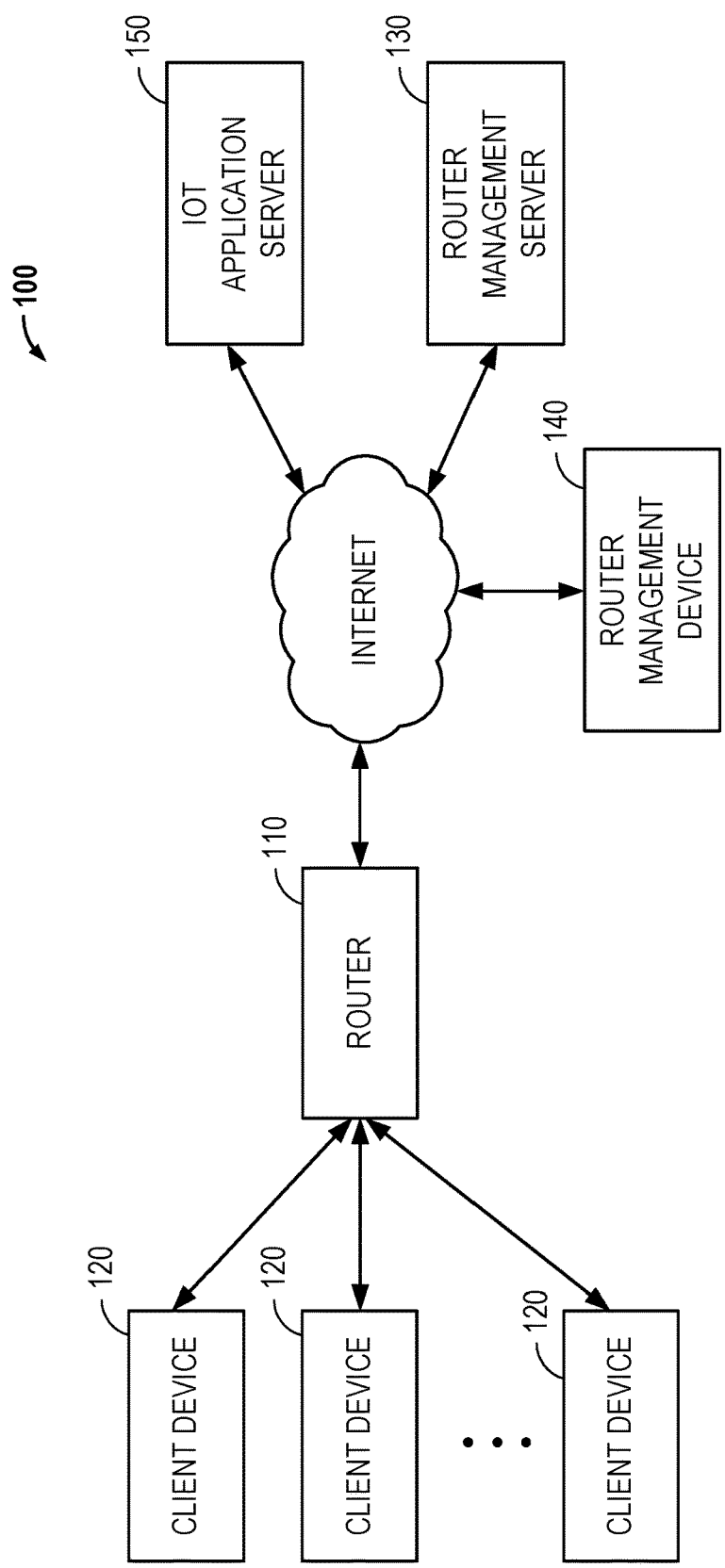
FIG. 1 is a block diagram illustrating an example environment in which embodiments of the disclosure may be practiced.

Referring to FIG. 1, a block diagram illustrating an example environment 100 in which embodiments of the disclosure may be practiced is shown. A router 110 may be connected to the Internet and may provide network access at a site, such as a home, an industrial environment, a utility, a city, a hospital, or a health provider, etc., through wired and/or wireless connections. One or more client devices 120 are connected to the router for network access. The wired connections may be, for example, Ethernet connections. The wireless connections may be, for example, Institute of Electrical and Electronics Engineers (IEEE) 802.11 WLAN (also known as Wi-Fi) connections, IEEE 802.15.4 connections (e.g., ZigBee, Thread, 6LoWPAN, etc.), or Bluetooth/Bluetooth Low Energy (BLE) connections, etc. The client devices 120 may, via the router 110, communicate with each other or communicate with destinations connected through the Internet. Some of the client devices 120 may be IoT devices. Other client devices 120 may include such conventional networkable devices as computers, printers, smartphones, tablets, game consoles, networked video streaming devices, etc. The router 110 may be connected to and may communicate with a remote router management server 130 via the Internet. The router 110 may receive configuration information from the router management server 130 and configure itself according to the configuration information received from the router management server 130. The router management server 130 may, via the Internet, manage a plurality of routers spread across different home networks.

Moreover, a router management device 140 may be connected to and may communicate with the router management server 130 via the Internet. The router management device 140 may be a computer, a smartphone, or a tablet, etc. The router management device 140 may be used by a user to configure the router 110 via the intermediacy of the router management server 130. For example, configuration information may be transmitted between the router management device 140 (or an application running on the router management device 140) and the router management server 130. In some instances, the router management device 140 may be connected to the Internet and then to the router management server 130 via the router 110. In other words, one of the client devices 120 may act as the router management device 140. Different methods for associating a particular router management device 140 and a router 110 have been contemplated. In one embodiment, a common owner/user of a router 110 and a router management device 140 may associate the router 110 and the router management device 140 by configuring the router 110 and the router management device 140 with a same user account as maintained at the router management server 130, such that only a router management device 140 under the owner/user's control can be used to control the router 110 belonging to the owner/user. Further, one or more IoT application servers 150 may also be connected to the Internet to provide services to IoT devices spread across different networks. Certain functionality may be achieved on an IoT device by allowing the IoT device to communicate with its corresponding IoT application server 150. Therefore, an IoT device, which may be a client device 120, may be connected to and may communicate with an IoT application server 150 via the router 110 and the Internet.

Figure 2:
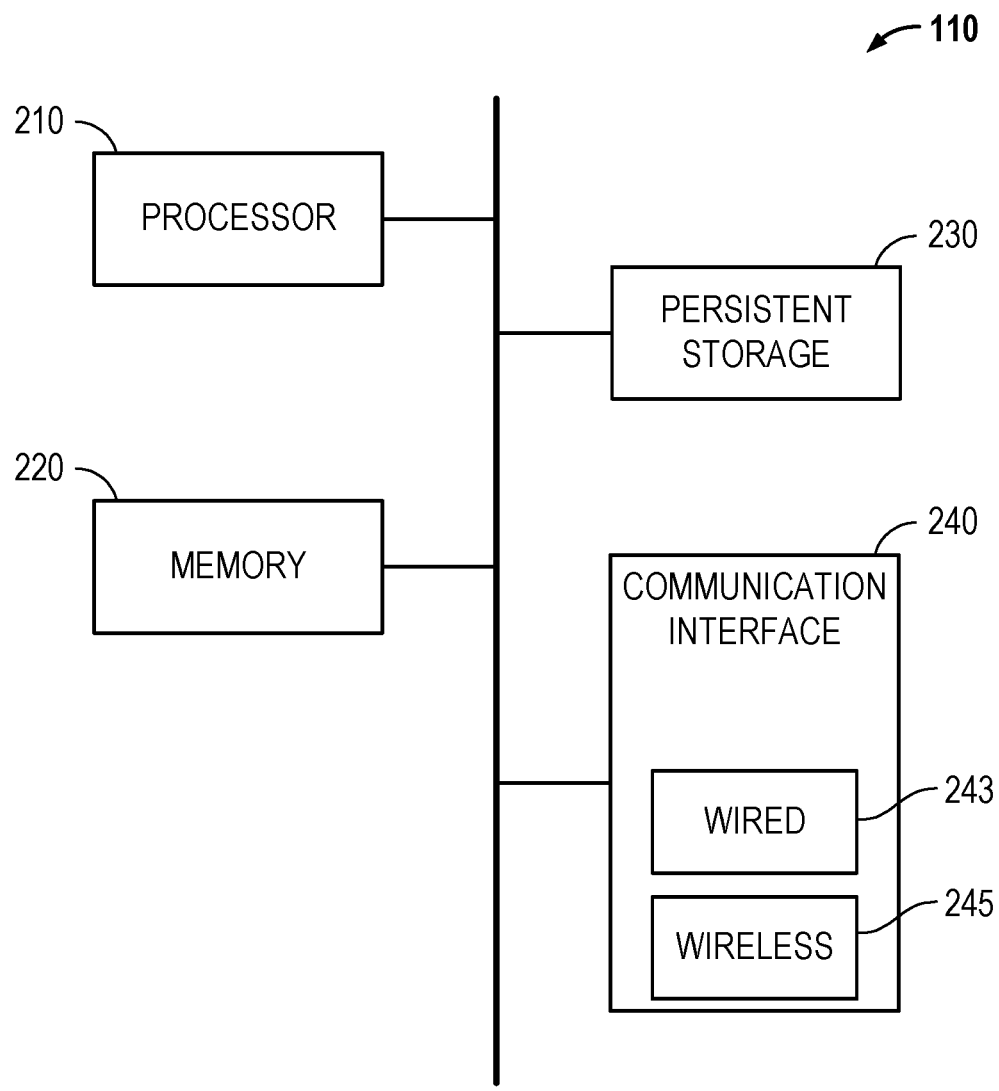
FIG. 2 is a block diagram illustrating an example router.

Referring to FIG. 2, a block diagram illustrating an example router 110 is shown. The router 110 may comprise a processor 210, a memory 220, a persistent storage 230, and a communication interface 240. The processor 210, the memory 220, the persistent storage 230, and the communication interface 240 may be interconnected by one or more buses or transmission media. The memory 220 may comprise a random access memory (RAM) and a read-only memory (ROM). The persistent storage 230 may comprise a solid-state storage device (e.g., a flash storage device), a hard disk drive, or the like, etc. The communication interface 240 may comprise a wired interface 243 such as an Ethernet interface, and/or a wireless interface 245 such as an IEEE 802.11 WLAN interface, which may further comprise radios and antennas, etc. Furthermore, the communication interface 240 may, in some embodiments, comprise other communication interfaces, such as a serial communication interface, a Universal Serial Bus (USB) interface, or the like, etc. Therefore, the communication interface 240 may enable the router to be connected to and to communicate with other devices, via the Internet or otherwise, and using one or more communication modes. The persistent storage 230 may comprise code, such as firmware, which, when loaded into the memory 220 and executed by the processor 210, may enable the router 110 to perform various functions. For example, the router 110 may route network traffic including incoming and outgoing traffic both within the home network and across the Internet. Further, the router 110 may implement access control rules which selectively allow certain network traffic and block other network traffic. Still further, the router 110 may utilize the empty space within the memory 220 or the persistent storage 230 and act as a temporary storage and batch-retransmission device. Still further, the router 110 may act as an encryptor/decryptor for communications between an IoT device within the home network and its associated IoT application server. Still further, the router 110 may help keep an internet protocol (IP) route open between a client device 120 (e.g., an IoT device) and a remote party (e.g., an IoT application server 150) by periodically transmitting keepalive (KA) messages to the remote party in the client device's stead. In one embodiment, the persistent storage 230 may comprise a secure storage. The processor 210 may comprise a secure execution environment (e.g., a Trusted Platform Module "TPM", a TrustZone, etc.).

Figure 3:
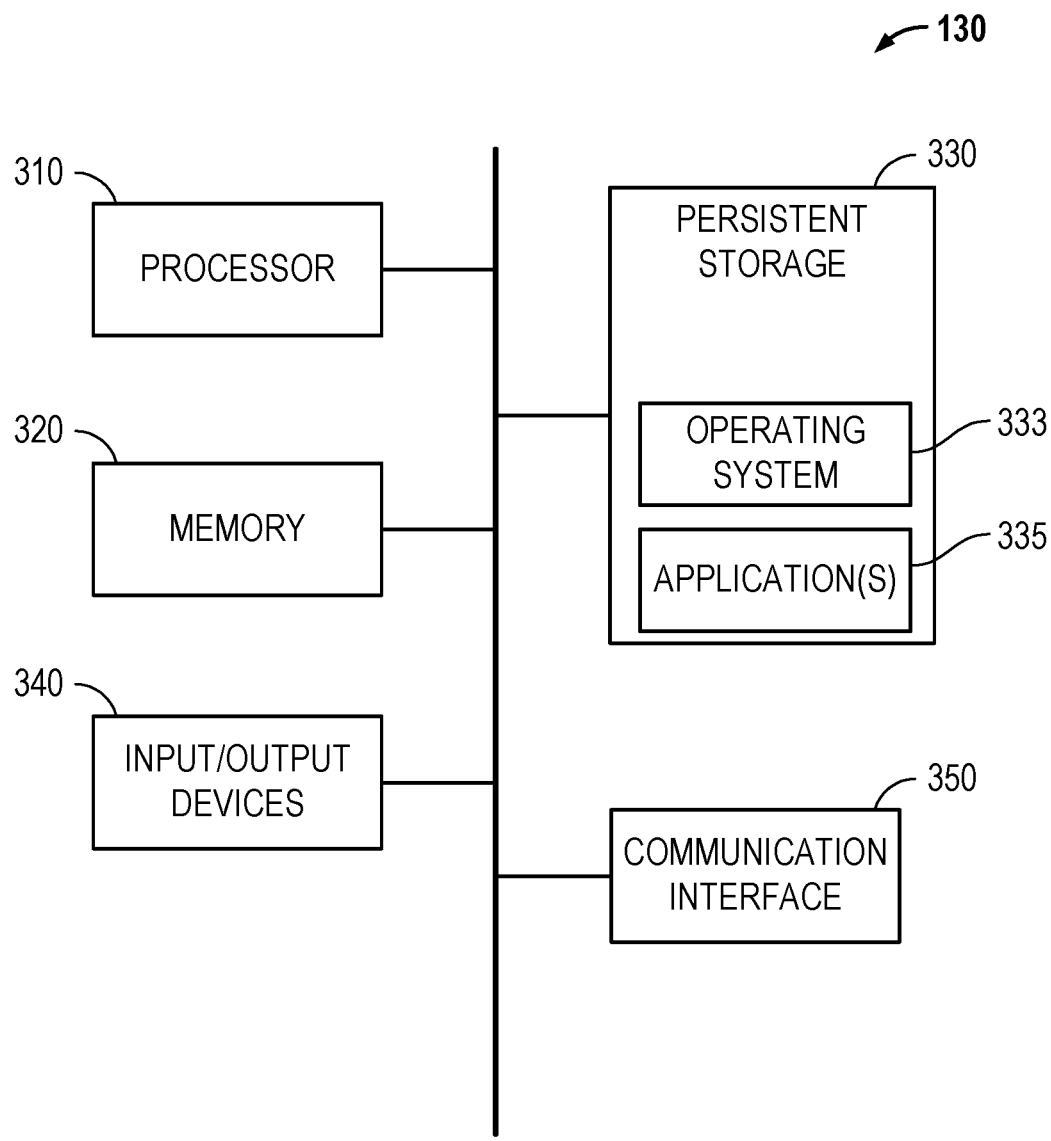
FIG. 3 is a block diagram illustrating an example router management server.

Referring to FIG. 3, a block diagram illustrating an example router management server 130 is shown. The router management server 130 may comprise a processor 310, a memory 320, a persistent storage 330, one or more input/output devices 340 and a communication interface 350. The memory 320 may comprise a random access memory (RAM) and a read-only memory (ROM). An operating system 333 and one or more applications 335 may be stored in the persistent storage 330. The code stored in the persistent storage 330 may be loaded into the memory 320 and executed by the processor 310. When code is executed by the processor 310, the router management server 130 may perform one or more functions based on the code, such as the operating system 333 or the applications 335. The one or more applications 335 may be adapted for various functions and purposes. For example, one application 335 may be adapted for managing the router 110. The communication interface 350 may enable the router management server 130 to communicate with one or more other devices including the router 110 and the router management device 140, directly or indirectly (e.g., via the Internet), using one or more known wired or wireless communication protocols.

Figure 4:
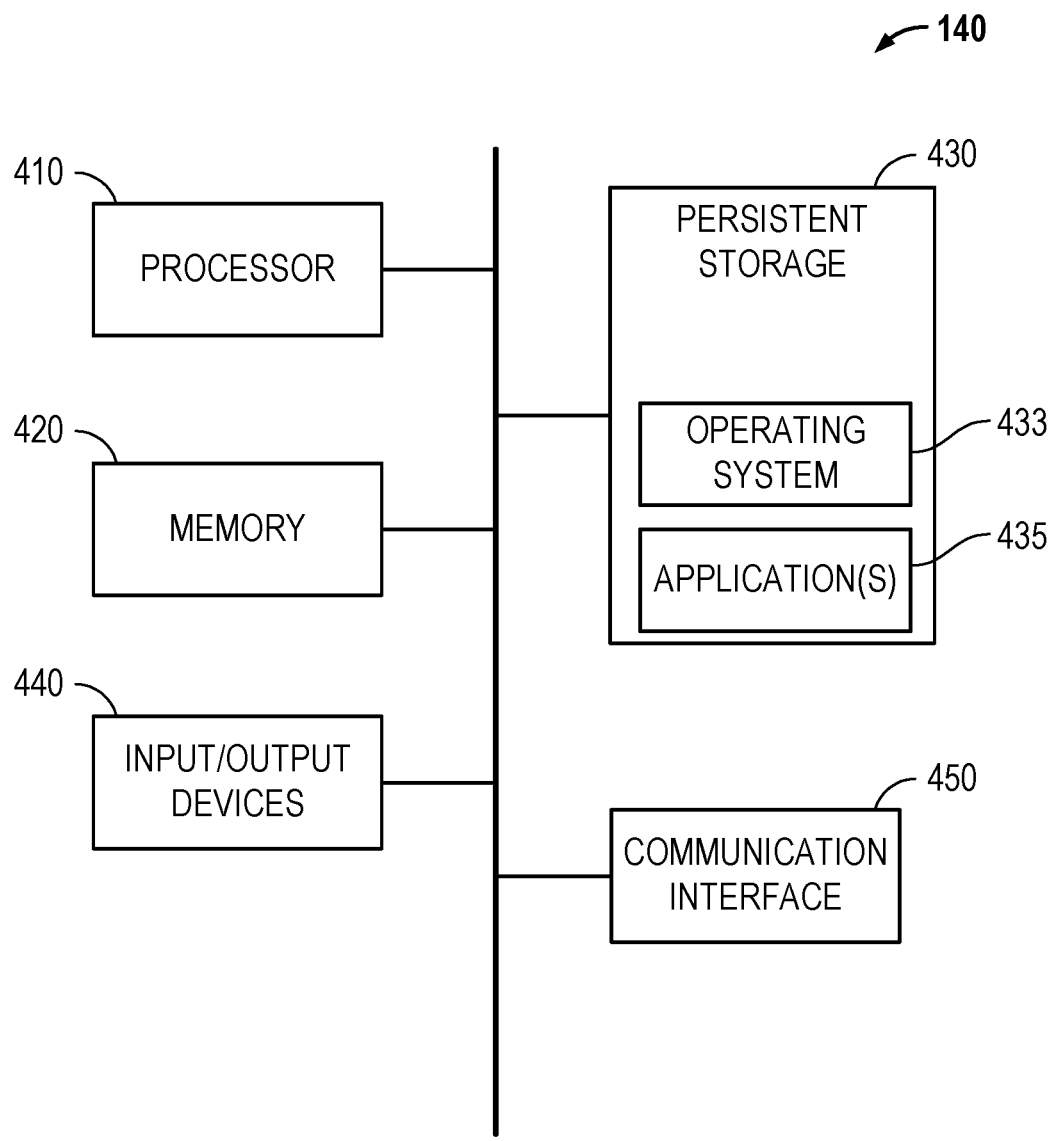
FIG. 4 is a block diagram illustrating an example router management device.

Referring to FIG. 4, a block diagram illustrating an example router management device 140 is shown. The router management device 140 may comprise a processor 410, a memory 420, a persistent storage 430, one or more input/output devices 440, and a communication interface 450. The memory 420 may comprise a random access memory (RAM) and a read-only memory (ROM). The input/output devices 440 may comprise a display, a keyboard, a touchscreen, or the like, etc. An operating system 433 and one or more applications 435 may be stored in the persistent storage 430. The code stored in the persistent storage 430 may be loaded into the memory 420 and executed by the processor 410. When code is executed by the processor 410, the router management device 140 may perform one or more functions based on the code, such as the operating system 433 or the applications 435. The one or more applications 435 may be adapted for various functions and purposes. For example, one application 435 may be adapted for configuring the router 110 through communications with the router management server 130. The communication interface 450 may enable the router management device 140 to communicate with one or more other devices including the router management server 130, directly or indirectly (e.g., via the Internet), using one or more known wired or wireless communication protocols. Therefore, the router management device 140 may be a computer, a smartphone, or a tablet, etc.

Merely by way of example, one or more procedures described with respect to the method(s) discussed below may be implemented as code and/or instructions executable by a device (and/or a processor within a device); in an aspect, then, such code and/or instructions can be used to configure and/or adapt a router 110, a router management server 130, or a router management device 140 to perform one or more operations in accordance with the described methods, according to embodiments described herein.

A set of these instructions and/or code may be stored on a non-transitory computer-readable storage medium, such as the persistent storage device(s) 230, 330, 430 described above. In some cases, the storage medium might be incorporated within a computer system, such as a router 110, a router management server 130, or a router management device 140. In other embodiments, the storage medium might be separate from the devices (e.g., a removable medium, such as a compact disc), and/or provided in an installation package, such that the storage medium can be used to program, configure, and/or adapt a computing device with the instructions/code stored thereon. These instructions might take the form of executable code, which is executable by the router 110, the router management server 130, or the router management device 140 and/or might take the form of source and/or installable code, which, upon compilation and/or installation on the router 110, the router management server 130, or the router management device 140 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, firmware, software, or combinations thereof, to implement embodiments described herein. Further, connection to other computing devices such as network input/output devices may be employed.

Embodiments of the disclosure relate to a method, system, and apparatus for managing a router 110 through a router management server 130. The management of a router 110 may comprise configuring the router 110 with access control rules and configuring the passphrases of WLAN(s) hosted by the router 110. In one embodiment, when a new client device 120, which may be a conventional device or an IoT device, is connected to the router 110, the type of the new client device 120 may be determined by either the router 110 or the router management server 130, or by both collaboratively, automatically or semi-automatically (e.g., a tentative automatically determined device type may be presented to the user on the router management device 140, and the user may be asked to confirm the determined device type). It should be appreciated that when router settings associated with a client device 120 previously connected to the router 110 is being reconfigured, the client device 120 may also be referred to as a new client device 120. Protocols such as Address Resolution Protocol (ARP), NetBIOS, Bonjour, or Active Directory may be utilized to obtain information about the new client device 120, such as its media access control (MAC) address, that can help with the determination of the type of the new client device 120. Additionally or alternatively, the type of the new client device 120 may be determined based on a user input. The user input may be a user selection, a picture of the new client device 120, or a picture of a bar code (a one-dimensional bar code, or a matrix barcode such as Quick Response "QR" code, etc.) associated with the new client device 120, etc. The type of the new client device 120 may be one of a computer, a printer, a smartphone, a tablet, a game console, a networked video streaming device, a surveillance camera, a thermostat, an irrigation system, a light bulb, a light switch, or an oven, etc. The list of the types is non-exhaustive and does not limit the disclosure.

The type of the new client device 120 may be determined based on any characteristic associated with the new client device 120. The characteristics may be detectable by the router 110 within communications of the new client device 120, such as between the new client device 120 and the router 110, or between the new client device 120 and other devices. Additionally or alternatively, the characteristics may be provided via a user input. A non-limiting list of characteristics that may be utilized to determine the type of the new client device 120 may include, e.g., a communication pattern, a keyword, a MAC address, a picture, or barcode-encoded information, etc. A first database that associates the characteristics with a device type and/or device make/model may be maintained at the router management server 130 or at another device in communication with the router management server 130 in order to assist in the determination of the device type. The first database may be maintained or updated manually by an administrator of the router management server 130, and/or through the use of such automatic or semi-automatic techniques as machine learning, etc. In embodiments where the router 110 determines the type of the new client device 120 or participates in the determination of the type of the new client device 120, the router 110 may from time to time retrieve an updated copy of the database from the router management server 130 and/or another device and store the copy of the database locally. In embodiments where the router management server 130 determines the type of the new client device 120 or participates in the determination of the type of the new client device 120, the router 110 may transmit the detected characteristics to the router management server 130. In another embodiment, the user may be asked to provide the type of the new client device 120 via the router management device 140, once the new client device 120 is detected by the router. The user may provide the type and/or the make/model of the new client device 120. The type of the new client device 120 may then be determined by the router 110 and/or the router management server 120 accordingly based on the user input. In still another embodiment, the user may be asked to provide a picture of a barcode associated with the new client device 120 or a picture of the new client device 120 itself via the router management device 140. The type of the new client device 120 may then be determined by the router 110 and/or the router management server 120 accordingly based on the barcode-encoded information and/or the picture of the new client device 120.

Based on the determined type of the new client device 120, the router management server 130 may determine one or more access control rules that are to be applied to the communications of the new client device 120. An access control rule, when applied, causes the router 110 to filter the network communications of (to and from) the new client device 120: approved communications may pass through the router 110 unhindered, while unapproved communications may be blocked/dropped by the router 110. The access control rule may be applied to the communications between the new client device 120 and other client devices 120 connected to the same router 110 and/or the communications between the new client device 120 and remote parties over wide-area network (WAN) (e.g., the Internet). An access control rule may be based on any suitable criterion. A non-limiting list of the criteria may include: a source IP address, a source MAC address, a source port, a destination IP address, a destination MAC address, or a destination port, etc. Access control rules that are to be applied to the communications of the new client device 120 may be determined automatically or semi-automatically (e.g., tentative automatically determined access control rules may be presented to the user on the router management device 140, and the user may be asked to confirm the access control rules that are to be applied) based on the determined type of the new client device 120.

For example, an irrigation system may be permitted to communicate with a computer or a home weather station on the home LAN, with a corresponding IoT application server 150 on the WAN (e.g., the Internet), or with a known weather server on the WAN, but may be forbidden from communicating with a printer on the home LAN. Similarly, a light switch may be permitted to communicate with light bulbs, but may be forbidden from communicating with a networked video streaming device on the home LAN. The examples are illustrative and do not limit the disclosure. Therefore, according to the access control rules, an IoT device may be forbidden from communicating with devices and/or ports unrelated to the intended functions of the IoT device. In one embodiment, according to the access control rules, IoT devices (e.g., ovens, irrigation systems, light switches, light bulbs, etc.) may be forbidden from accessing the management interface (e.g., a web management interface, or a console management interface) of the router 110. A second database maintained at the router management server 130 or at another device in communication with the router management server 130 may be utilized to associate the device type and/or make/model with access control rules and to assist in determining the access control rules that are to be applied based on the determined device type. The second database may be maintained or updated manually by an administrator of the router management server 130, and/or through the use of such automatic or semi-automatic techniques as machine learning, etc. The determined access control rules may be transmitted from the router management server 130 to the relevant router 110, and the router 110 may begin applying the received access control rules to the communications of the new client device 120. It should be appreciated that as the router management server 130 may be used to manage a plurality of, and potentially a large number of routers 110, the first and second databases maintained at the router management server 130 may include information related to a great variety of client devices 120, and may be very responsive to client devices newly introduced to the market. For example, the first database may include such proprietary information as device models, versions, or production lines, etc., associated with MAC address ranges. Therefore, the ability to determine the type of the new client device 120 and to determine the access control rules to be applied may be always or almost always up-to-date. Further, it should be appreciated that the first and second databases may be implemented as a single database such that access control rules to be applied to a new client device 120 may be determined directly based on one or more characteristics associated with the new client device 120.

In one embodiment, based on the determined type and/or make/model of the new client device 120, the router management server 130 may enable special functions at the relevant router 110 for the new client device 120. The special functions may be enabled as part of paid services. One example of a special function is an encryptor/decryptor function: the router 110 may act as an encryptor/decryptor for the communications between the new client device 120 and a corresponding IoT application server 150 on the WAN (e.g., the Internet). For data transmitted from the new client device 120 to the IoT application server 150, the router 110 may encrypt the data, and for data transmitted from the IoT application server 150 to the new client device 120, the router 110 may decrypt the data. It should be appreciated that the corresponding IoT application server 150 needs to be preconfigured with the ability to decrypt the data encrypted by the router 110 and to encrypt data in a way that can be decrypted by the router 110. Any known encryption algorithms and methods may be utilized. Another example of a special function is a storage/batch-retransmission function: for data transmitted from the new client device 120 to the corresponding IoT application server 150, the router 110 may hold and store the data in its memory 220 and/or persistent storage 230 over a time period without immediately forwarding the data to the IoT application server 150, and then transmit the stored data after a time period and/or after the volume of stored data has reached a threshold in a batch to the IoT application server 150. A further example of a special function is a persistent link function: the router 110 may send periodical keepalive (KA) messages for the new client device 120 to the corresponding IoT application server 150 to keep the IP route between the new client device 120 and the corresponding IoT application server 150 open, so that the new client device 120 does not have to send the KA messages itself. It should be appreciated that the special functions may help mitigate the drawbacks of IoT devices caused by their limited processing power, limited battery capacity, or limited storage space.

Figure 5:
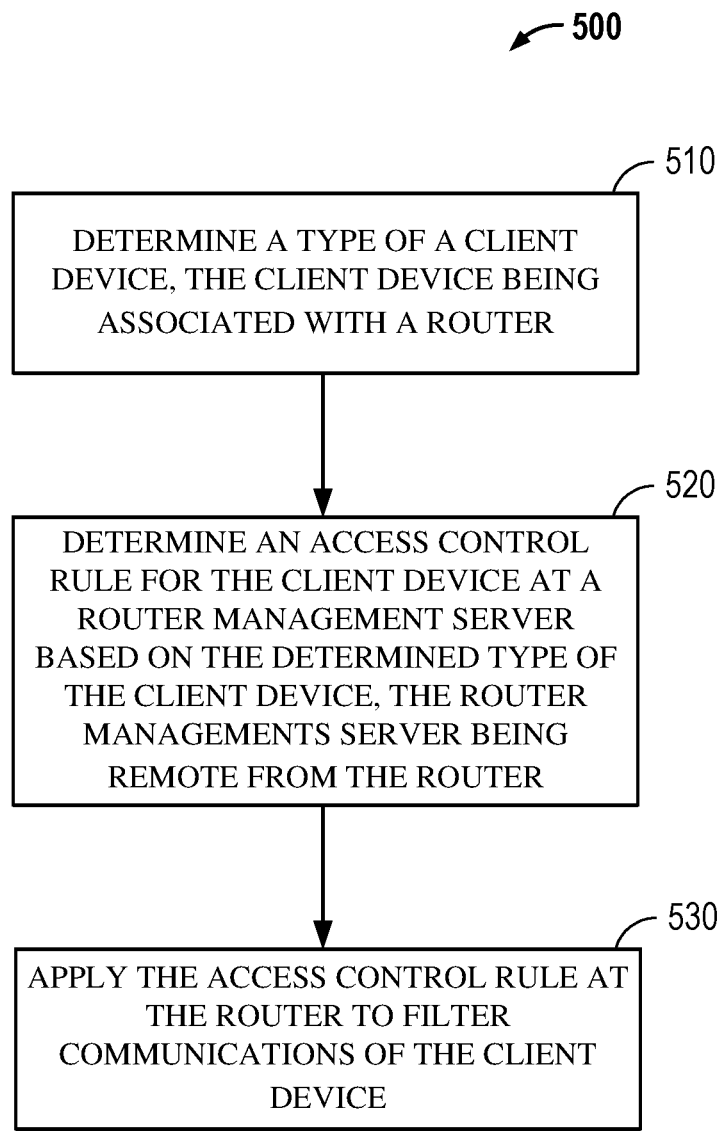
FIG. 5 is a flowchart illustrating an example method for determining an access control rule based on a client device type.

Referring to FIG. 5, a flowchart illustrating an example method 500 for determining an access control rule based on a client device type is shown. At block 510, a type of the client device may be determined, the client device being associated with a router. As described in detail above, the type of the client device may be determined at the router and/or a router management server. At block 520, an access control rule for the client device may be determined at a router management server based on the determined type of the client device. At block 530, the access control rule may be applied at the router to filter the communications of the client device.

In one embodiment, at least some of the client devices 120 that are connected to the router 110 wirelessly may be assigned MAC address-bound WLAN passphrases. A WLAN passphrase for a particular client device 120 may be bound to the MAC address of the WLAN interface of the client device 120, such that only a correct WLAN passphrase-MAC address combination may enable the client device 120 to join the WLAN hosted by the router 110. In one embodiment, the MAC address-bound WLAN passphrase may be assigned to a client device 120 the first time the client device 120 attempts to join the WLAN. The user then may configure the client device 120 with the assigned WLAN passphrase, so that the client device 120 may successfully join the WLAN. The WLAN passphrase may be generated by the router 110 or by the router management server 130 and then displayed to the user on the router management device 140, or may be specified by the user through the router management device 140. The assigned WLAN passphrase may be stored at the router 110 or at the router management server 130. The stored WLAN passphrase may be protected. In one embodiment, the combination of the WLAN passphrase and the MAC address may be stored in a secure storage (e.g., secure storage hardware such as a Trusted Platform Module "TPM", a TPM smart card, or a Secure Digital "SD" card, etc.) of the router 110, or may be stored at the router 110 in an obfuscated or encrypted form. In another embodiment, the combination of the WLAN passphrase and the MAC address may be stored at the router management server 130. Some operations involving the WLAN passphrase (e.g., the construction of the Pairwise Master Key "PMK" and the Pairwise Transient Key "PTK" and the computation of the Message Integrity Code "MIC," etc., in the four-way handshake process) may be performed at the router management server 130, or in a secure hardware environment (e.g., a secure processor, a Trusted Platform Module "TPM", a TrustZone, etc.) in the router 110, in order to safeguard the WLAN passphrase. Information may be transmitted between the router 110 and the router management server 130, as necessary as determined by the handshake process. In one embodiment, the MAC address-bound WLAN passphrase may be associated with a time of expiration or a validity period. For example, the WLAN passphrase may expire 1 hour, 2 hours, 3 hours, 6 hours, 1 day, 1 week, or 1 month, etc., after first assignment. The expiration periods are illustrative and do not limit the disclosure. Therefore, a guest to a home may be provided with a WLAN passphrase that expires after the guest leaves, and more permanent WLAN passphrases need not be disclosed to the guest. In a further embodiment, the MAC address-bound WLAN passphrase may be associated with an access control rule. For example, a device connected to the router 110 using a WLAN passphrase given to a guest may be restricted from accessing local file systems on the home LAN that hold private information.

The following Table 1 illustrates example stored MAC address-WLAN passphrase combinations. The contents of the table are exemplary and illustrative and do not limit the disclosure. It should be appreciated that it is permissible for a same WLAN passphrase to be bound to more than one MAC addresses. It may also be permissible for a single MAC address to bind to more than one passphrases. Therefore, a MAC address-bound WLAN passphrase would enable a client device to connect to the WLAN hosted by the router only when the MAC address of the client device is the same as the MAC address or one of the MAC addresses bound to the WLAN passphrase. In one embodiment, a default passphrase may be provided that is valid for MAC addresses not present in the stored MAC address-WLAN passphrase combinations. In another embodiment, a default passphrase may be provided that is valid for any and all MAC addresses. In another embodiment, no default passphrase is provided, and a client device with a MAC address not present in the stored MAC address-WLAN passphrase combinations may be prevented from connecting to the WLAN hosted by the router altogether. As described above, a WLAN passphrase may be associated with a validity period and/or one or more access control rules. In different embodiments, when a WLAN passphrase associated with access control rules is used by a client device to connect to the router, the access control rules associated with the WLAN passphrase may be applied in addition to or in lieu of the access control rules based on the determined type of the client device.

TABLE 1

MAC address-WLAN passphrase combinations

| MAC Address | WLAN Passphrase |
| --- | --- |
| 00-11-22-33-44-55 | Passphrase1 |
| 11-22-33-44-55-66 | Passphrase2 |
| 22-33-44-55-66-77 | Passphrase3 |
| . . . | . . . |
| (All Others) | (PassphraseDefault) |

As the WLAN passphrases may be bound to the MAC address associated with the device, the potential damage that may be caused by a stolen or compromised WLAN passphrase is reduced. The potential damage may be further reduced by a combination of MAC address-bound WLAN passphrase and appropriate access control rules, as described above. For example, even if a hacker or malware is able to steal the WLAN passphrase form an irrigation system, joining the WLAN with the stolen WLAN passphrase is not possible without also spoofing the MAC address of the irrigation system. Further, even if the hacker or malware joins the WLAN using the stolen WLAN passphrase and the spoofed MAC address and assumes the identity of the irrigation system, the malicious operations that can be performed by the hacker or malware are limited because access control rules may limit the communication partners of the irrigation system to only a small number of devices on the home LAN and on the WAN (e.g., the Internet) and block or exclude communications with high-value targets. If too many (e.g., above a threshold) communication attempts inconsistent with an irrigation system are made by a device self-identifying as an irrigation system, an alert may be issued to a user or to the router management server 130 to report the hacked or spoofed device. Therefore, compared to the scenario where a universal WLAN passphrase is utilized and stolen from an irrigation system, the potential damage is greatly reduced with the MAC address-bound WLAN passphrase and the access control rules.

Figure 6A:
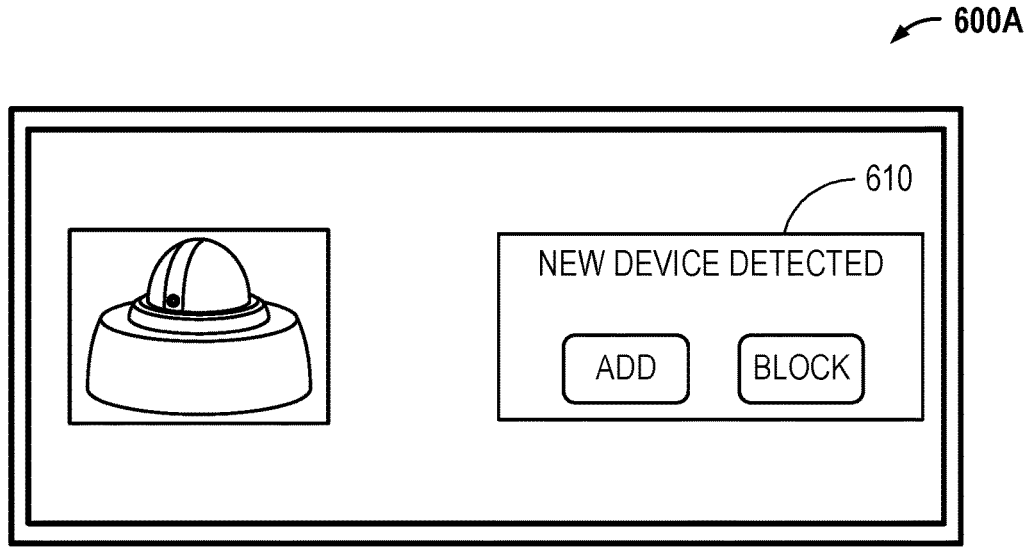
FIGS. 6A-6C are diagrams illustrating example screen display contents on a router management device during the process of adding a new client device.
Figure 6B:
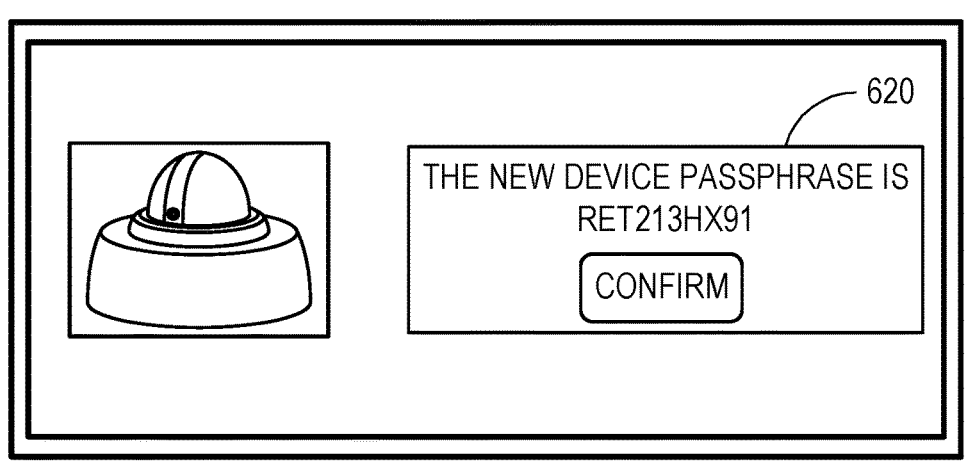
Figure 6C:
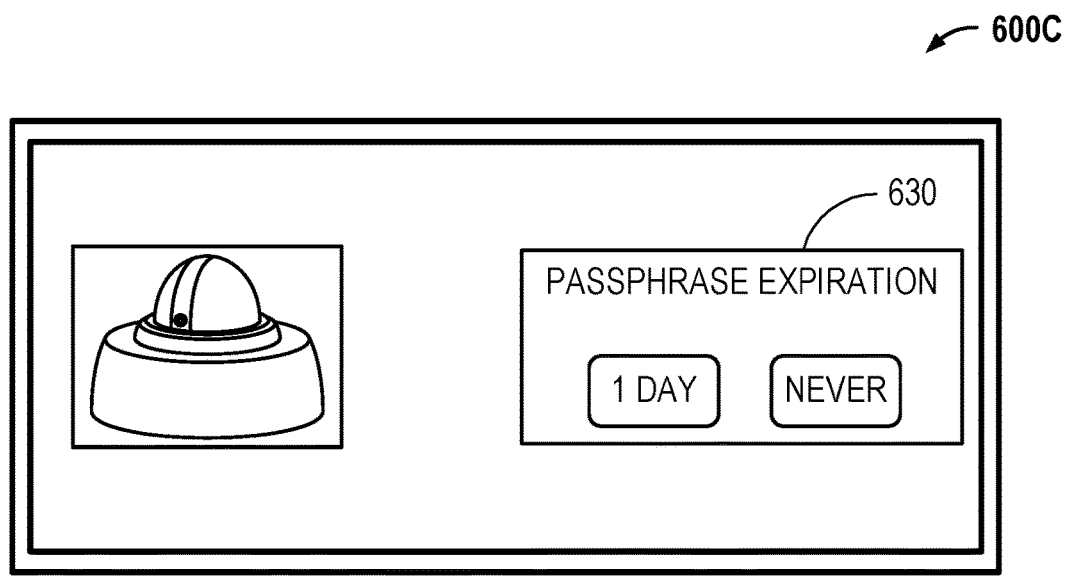

Referring to FIGS. 6A-6C, diagrams illustrating example screen display contents 600A-600C on a router management device 140 during the process of adding a new client device are shown. These diagrams are illustrative and do not limit the disclosure in any way. In FIG. 6A, the user is notified in a dialog box 610 that an attempt to join the WLAN hosted by the router 110 by a new client device (e.g., an irrigation system) has been detected. An image representing the new client device may be shown to help the user identify the device. The user is prompted to choose between allowing the new client device to join the WLAN (e.g., "ADD") and disallowing the new client device from joining the WLAN (e.g., "BLOCK"). After the user chooses to allow the new client device to join the WLAN, in FIG. 6B, a WLAN passphrase generated for the new client device (e.g., the irrigation system) and bound to the MAC address associated with the new client device is displayed to the user in a dialog box 620. The user is asked to confirm the displayed WLAN passphrase. The user then may configure the new client device (e.g., the irrigation system) with the displayed WLAN passphrase, so that the new client device may successfully join the WLAN. In FIG. 6C, the user is prompted in a dialog box 630 to choose between setting a 1-day expiration period for the WLAN passphrase (e.g., "1 DAY") and making the WLAN passphrase permanent (e.g., "NEVER").

Figure 7:
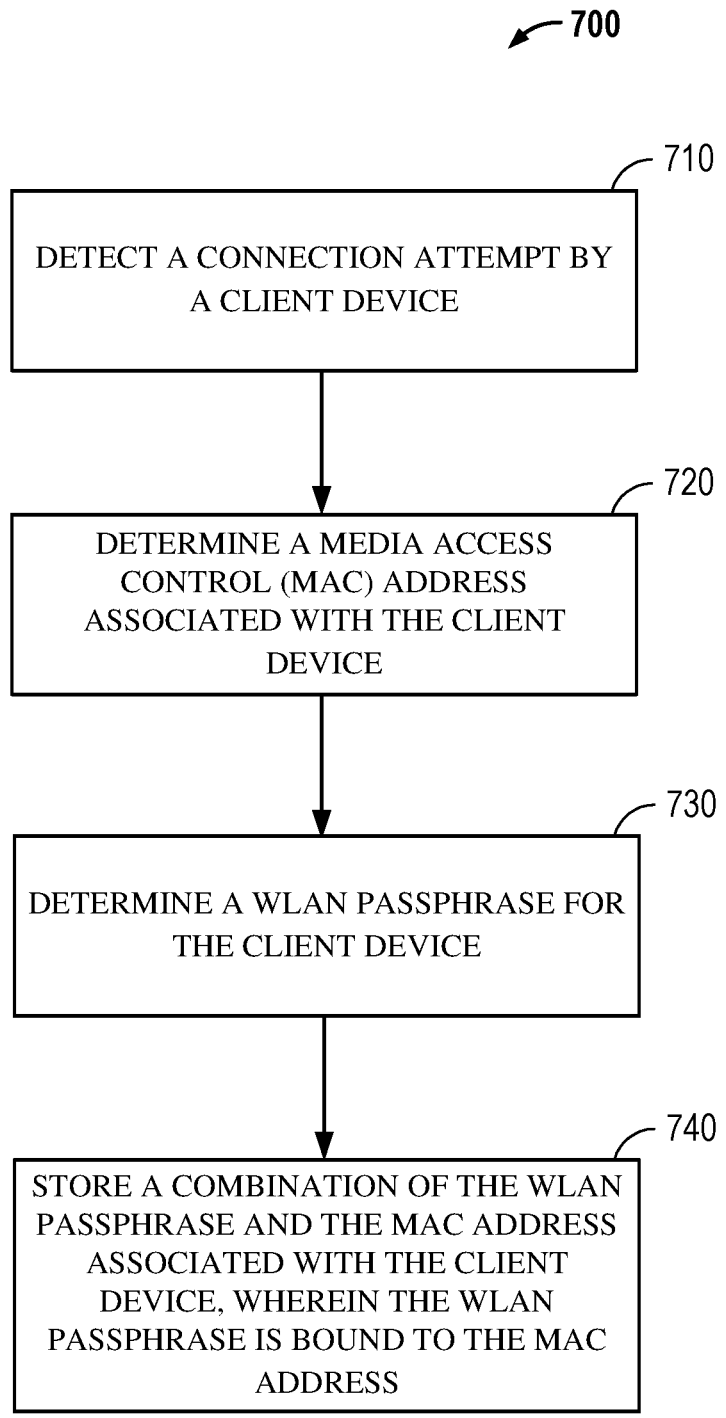
FIG. 7 is a flowchart illustrating an example method for assigning a MAC address-bound WLAN passphrase to a client device.

Referring to FIG. 7, a flowchart illustrating an example method 700 for assigning a MAC address-bound WLAN passphrase to a client device is shown. At block 710, a connection attempt by a client device may be detected. At block 720, a MAC address associated with the client device may be determined. At block 730, a WLAN passphrase may be determined for the client device. At block 740, a combination of the WLAN passphrase and the MAC address associated with the client device may be stored, wherein the WLAN passphrase is bound to the MAC address. The WLAN passphrase may be shown to the user via, e.g., the router management device 140.

Figure 8:
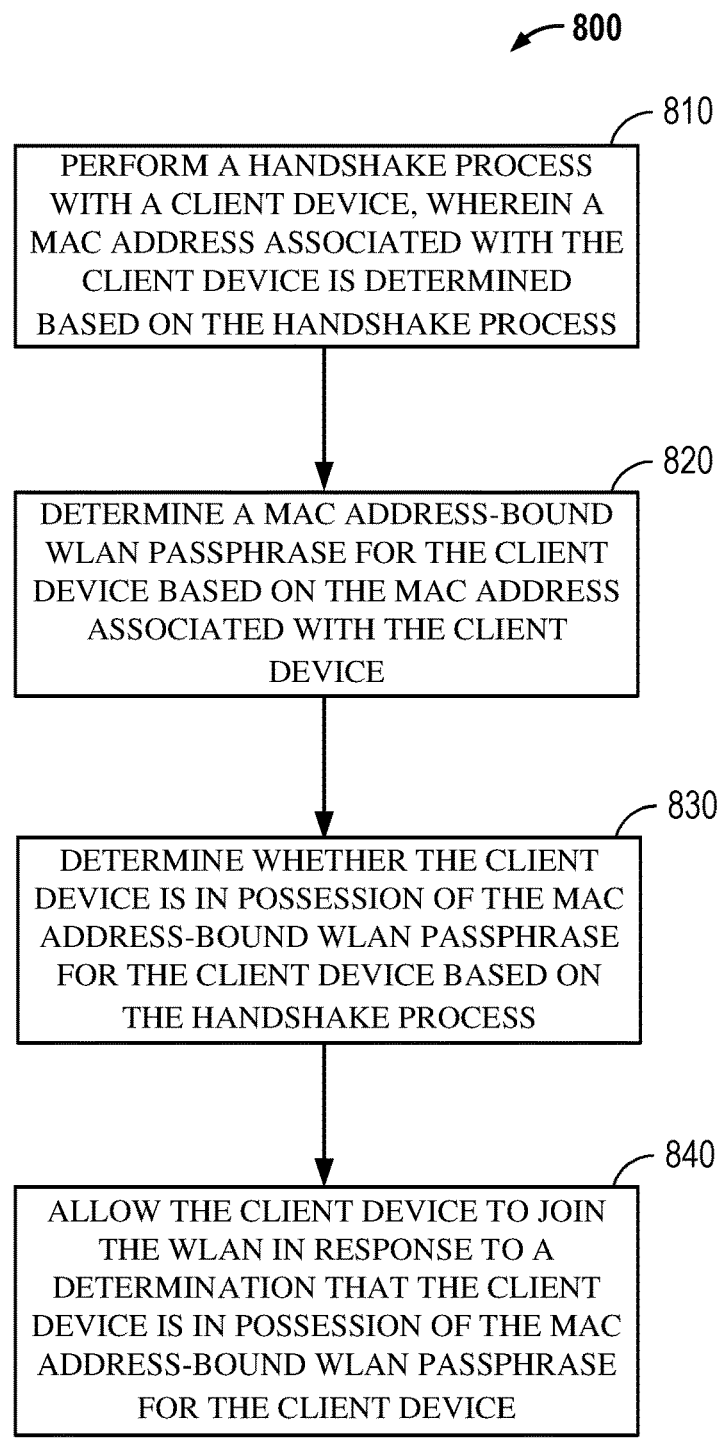
FIG. 8 is a flowchart illustrating an example method for verifying a MAC address-bound WLAN passphrase.

Referring to FIG. 8, a flowchart illustrating an example method 800 for verifying a MAC address-bound WLAN passphrase is shown. At block 810, a handshake process may be performed with a client device, wherein a MAC address associated with the client device may be determined based on the handshake process. The handshake process may be, e.g., a four-way handshake process as specified in the IEEE 802.11 standard. At block 820, a MAC address-bound WLAN passphrase may be determined for the client device based on the MAC address associated with the client device. The determination may be based on the stored MAC address-WLAN passphrase combinations. At block 830, whether the client device is in possession of the MAC address-bound WLAN passphrase for the client device, as identified by its MAC address, may be determined based on the handshake process. The determination may be based on a verification of a Message Integrity Code (MIC) transmitted by the client device. At block 840, the client device may be allowed to join the WLAN in response to a determination that the client device is in possession of the MAC address-bound WLAN passphrase for the client device, as identified by its MAC address. It should be appreciated that if the MAC address of the client device is not found within any stored MAC address-WLAN passphrase combinations, the client device may be allowed to join the WLAN based on a default passphrase, or may be refused from joining the WLAN altogether, depending on the configuration. Some operations on the authenticator side (e.g., the router 110 and the router management server 130) involving the WLAN passphrase (e.g., the construction of the Pairwise Master Key "PMK" and the Pairwise Transient Key "PTK" and the computation of the Message Integrity Code "MIC," etc., in the four-way handshake process) may be performed at the router management server 130, or in a secure hardware environment (e.g., a secure processor, a Trusted Platform Module "TPM", a TrustZone, etc.) in the router 110, in order to safeguard the WLAN passphrase. Information may be transmitted between the router 110 and the router management server 130, as necessary as determined by the handshake process.

One embodiment of the disclosure is related to an apparatus comprising: a memory; and a processor coupled to the memory, the processor to: determine a type of a client device, the client device being associated with a router, determine an access control rule for the client device at a router management server based on the determined type of the client device, the router managements server being remote from the router, and apply the access control rule at the router to filter communications of the client device.

One embodiment of the disclosure is related to a router apparatus comprising: a memory; and a processor coupled to the memory, the processor to: determine a characteristic associated with a client device, transmit the characteristic associated with the client device to a remote server, receive an access control rule for the client device from the remote server, and apply the access control rule to communications of the client device.

One embodiment of the disclosure is related to a router management server apparatus comprising: a memory; and a processor coupled to the memory, the processor to: receive a characteristic associated with a client device, determine a type of the client device based on the characteristic, determine an access control rule for the client device based on the type of the client device, and transmit the access control rule for the client device to a router, wherein the router management server apparatus is remote from the router.

One embodiment of the disclosure is related to an apparatus comprising: a memory; and a processor coupled to the memory, the processor to: detect a connection attempt by a client device, determine a media access control (MAC) address associated with the client device, determine a WLAN passphrase for the client device, and store a combination of the WLAN passphrase and the MAC address associated with the client device, wherein the WLAN passphrase is bound to the MAC address.

One embodiment of the disclosure is related to an apparatus comprising: a memory; and a processor coupled to the memory, the processor to: perform a handshake process with a client device, wherein a MAC address associated with the client device is determined based on the handshake process, determine a MAC address-bound WLAN passphrase for the client device based on the MAC address associated with the client device, determine whether the client device is in possession of the MAC address-bound WLAN passphrase for the client device based on the handshake process, and allow the client device to join the WLAN in response to a determination that the client device is in possession of the MAC address-bound WLAN passphrase for the client device.

Therefore, by utilizing embodiments of the disclosure, as described in detail above, a router management server may be utilized to manage a plurality of home routers. Appropriate access control rules may be determined for various client devices including IoT devices based on the type and/or make/model of the client devices. MAC address-bound WLAN passphrases may be assigned to the client devices and bound to the MAC addresses associated the client devices. Further, WLAN passphrases may be associated with expiration periods and/or access control rules. Therefore, a secure home network environment that takes into account the vulnerabilities of IoT devices may be achieved without the involvement of an IT department. Moreover, embodiments of the disclosure improve the flexibility of WLAN passphrase management.

It should be appreciated that aspects of the previously described processes may be implemented in conjunction with the execution of instructions by a processor (e.g., processor 210, 310, 410) of a device (e.g., a router 110, a router management server 130, a router management device 140), as previously described. Particularly, circuitry of the devices, including but not limited to processors, may operate under the control of a program, routine, or the execution of instructions to execute methods or processes in accordance with embodiments described (e.g., the processes and functions of FIGS. 5, 7, and 8). For example, such a program may be implemented in firmware or software (e.g. stored in memory and/or other locations) and may be implemented by processors and/or other circuitry of the devices. Further, it should be appreciated that the terms device, processor, microprocessor, circuitry, controller, SoC, etc., refer to any type of logic or circuitry capable of executing logic, commands, instructions, software, firmware, functionality, etc.

It should be appreciated that when the devices are wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, LTE Advanced, 4G, 5G, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., communication subsystems/interfaces (e.g., air interfaces)) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a virtual reality or augmented reality device, a personal data assistant ("PDA"), a tablet, a wearable device, an Internet of Things (IoT) device, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other type of computing device. These devices may have different power and data requirements.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, firmware, or combinations of both. To clearly illustrate this interchangeability of hardware, firmware, or software, various illustrative components, blocks, modules, circuits, and steps have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), a system on a chip (SoC), or other programmable logic device, discrete gate or transistor logic, discrete hardware components, or any combination thereof designed to perform the functions described herein. A general purpose processor may be a microprocessor or may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in firmware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for assigning a media access control (MAC) address-bound wireless local area network (WLAN) passphrase to a client device, comprising:
   detecting a connection attempt by the client device;
   determining a MAC address associated with the client device;
   determining a WLAN passphrase for the client device;
   storing a combination of the WLAN passphrase and the MAC address associated with the client device in a secure storage of a WLAN router, the secure storage being implemented with secure storage hardware, wherein the WLAN passphrase is bound to the MAC address;
   determining a type of the client device based on the MAC address associated with the client device;
   receiving an access control rule for the client device determined based on the determined type of the client device from a remote router management server;
   associating the access control rule for the client device with the WLAN passphrase for the client device;
   applying the access control rule at the WLAN router to filter communications of the client device, wherein the access control rule limits communication partners of the client device to a limited number of devices related to intended functions of the client device, and wherein the access control rule is determined at the remote router management server based on the determined type of the client device; and
   enabling an encryptor/decryptor function for the client device at the WLAN router, the encryptor/decryptor function comprising encrypting at the WLAN router transmission from the client device to an application server, and decrypting at the WLAN router transmission from the application server to the client device, wherein the application server is configured to decrypt the transmission from the client device to the application server that is encrypted by the WLAN router and to encrypt the transmission from the application server to the client device that is decryptable by the WLAN router, and wherein the client device is an Internet of Things (IoT) device and the application server is an IoT application server associated with the client device.

2. The method of claim 1, wherein the combination of the WLAN passphrase and the MAC address is stored at a server remote from a WLAN router managed by the server.

3. The method of claim 1, wherein the storing of the combination of the WLAN passphrase and the MAC address is in response to a user approval at a router management device.

4. A wireless local area network (WLAN) router apparatus, comprising:
   a memory; and
   a processor coupled to the memory, the processor to:
   detect a connection attempt by a client device,
   determine a media access control (MAC) address associated with the client device,
   determine a WLAN passphrase for the client device,
   store a combination of the WLAN passphrase and the MAC address associated with the client device in a secure storage of the WLAN router apparatus, the secure storage being implemented with secure storage hardware, wherein the WLAN passphrase is bound to the MAC address,
   determine a type of the client device based on the MAC address associated with the client device,
   receive an access control rule for the client device determined based on the determined type of the client device from a remote router management server;
   associate the access control rule for the client device with the WLAN passphrase for the client device;
   apply the access control rule at the WLAN router apparatus to filter communications of the client device, wherein the access control rule limits communication partners of the client device to a limited number of devices related to intended functions of the client device, and wherein the access control rule is determined at the remote router management server based on the determined type of the client device, and
   enable an encryptor/decryptor function for the client device at the WLAN router, the encryptor/decryptor function comprising encrypting at the WLAN router transmission from the client device to an application server, and decrypting at the WLAN router transmission from the application server to the client device, wherein the application server is configured to decrypt the transmission from the client device to the application server that is encrypted by the WLAN router and to encrypt the transmission from the application server to the client device that is decryptable by the WLAN router, and wherein the client device is an internet of Things (IoT) device and the application server is an IoT application server associated with the client device.

5. The WLAN router apparatus of claim 4, wherein the combination of the WLAN passphrase and the MAC address is stored at a server that manages the WLAN router, the server being remote from the WLAN router.

6. A non-transitory computer-readable medium comprising code which, when executed by a processor, causes the processor to perform a method comprising:
   detecting a connection attempt by a client device;

determining a media access control (MAC) address associated with the client device;

determining a wireless local area network (WLAN) passphrase for the client device;

storing a combination of the WLAN passphrase and the MAC address associated with the client device in a secure storage of a WLAN router, the secure storage being implemented with secure storage hardware, wherein the WLAN passphrase is bound to the MAC address;

determining a type of the client device based on the MAC address associated with the client device;

receiving an access control rule for the client device determined based on the determined type of the client device from a remote router management server;

associating the access control rule for the client device with the WLAN passphrase for the client device;

applying the access control rule at the WLAN router to filter communications of the client device, wherein the access control rule limits communication partners of the client device to a limited number of devices related to intended functions of the client device, and wherein the access control rule is determined at the remote router management server based on the determined type of the client device; and enabling an encryptor/decryptor function for the client device at the WLAN router, the encryptor/decryptor function comprising encrypting at the WLAN router transmission from the client device to an application server, and decrypting at the WLAN router transmission from the application server to the client device, wherein the application server is configured to decrypt the transmission from the client device to the application server that is encrypted by the WLAN router and to encrypt the transmission from the application server to the client device that is decryptable by the WLAN router, and wherein the client device is an Internet of Things (IoT) device and the application server is an IoT application server associated with the client device.

7. The non-transitory computer-readable medium of claim 6, wherein the combination of the WLAN passphrase and the MAC address is stored at a server remote from a WLAN router managed by the server.

8. A method for verifying a media access control (MAC) address-bound wireless local area network (WLAN) passphrase, comprising:

performing a handshake process with a client device, wherein a MAC address associated with the client device is determined based on the handshake process;

determining a MAC address-bound WLAN passphrase for the client device based on the MAC address associated with the client device, wherein the MAC address-bound WLAN passphrase is stored in a secure storage of a WLAN router, the secure storage being implemented with secure storage hardware;

determining whether the client device is in possession of the MAC address-bound WLAN passphrase for the client device based on the handshake process;

allowing the client device to join the WLAN in response to a determination that the client device is in possession of the MAC address-bound WLAN passphrase for the client device;

determining a type of the client device based on the MAC address associated with the client device;

receiving an access control rule for the client device determined based on the determined type of the client device from a remote router management server;

associating the access control rule for the client device with the WLAN passphrase for the client device;

applying the access control rule at the WLAN router to filter communications of the client device, wherein the access control rule limits communication partners of the client device to a limited number of devices related to intended functions of the client device, and wherein the access control rule is determined at the remote router management server based on the determined type of the client device; and enabling an encryptor/decryptor function for the client device at the WLAN router, the encryptor/decryptor function comprising encrypting at the WLAN router transmission from the client device to an application server, and decrypting at the WLAN router transmission from the application server to the client device, wherein the application server is configured to decrypt the transmission from the client device to the application server that is encrypted by the WLAN router and to encrypt the transmission from the application server to the client device that is decryptable by the WLAN router, and wherein the client device is an Internet of Things (IoT) device and the application server is an IoT application server associated with the client device.

9. The method of claim 8, wherein the performing of the handshake process further comprises generating at least one of a Pairwise Master Key (PMK), a Pairwise Transient Key (PTK), or a Message Integrity Code (MIC) in a secure hardware environment of a WLAN router.

10. The method of claim 8, wherein the performing of the handshake process further comprises generating at least one of a Pairwise Master Key (PMK), a Pairwise Transient Key (PTK), or a Message Integrity Code (MIC) at a server remote from a WLAN router managed by the server.

11. The method of claim 8, further comprising allowing the client device to join the WLAN based on a default WLAN passphrase.

12. A wireless local area network (WLAN) router apparatus, comprising:

a memory; and a processor coupled to the memory, the processor to:

perform a handshake process with a client device, wherein a media access control (MAC) address associated with the client device is determined based on the handshake process, determine a MAC address-bound WLAN passphrase for the client device based on the MAC address associated with the client device, wherein the MAC address-bound WLAN passphrase is stored in a secure storage of the WLAN router apparatus, the secure storage being implemented with secure storage hardware, determine whether the client device is in possession of the MAC address-bound WLAN passphrase for the client device based on the handshake process, allow the client device to join the WLAN in response to a determination that the client device is in possession of the MAC address-bound WLAN passphrase for the client device, determine a type of the client device based on the MAC address associated with the client device, receive an access control rule for the client device determined based on the determined type of the client device from a remote router management server, associate the access control rule for the client device with the WLAN passphrase for the client device, apply the access control rule at the WLAN router apparatus to filter communications of the client device, wherein the access control rule limits communication partners of the client device to a limited number of devices related to intended functions of the client device, and wherein the access control rule is determined at the remote router management server based on the determined type of the client device, and enable an encryptor/decryptor function for the client device at the WLAN router, the encryptor/decryptor function comprising encrypting at the WLAN router transmission from the client device to an application server, and decrypting at the WLAN router transmission from the application server to the client device, wherein the application server is configured to decrypt the transmission from the client device to the application server that is encrypted by the WLAN router and to encrypt the transmission from the application server to the client device that is decryptable by the WLAN router, and wherein the client device is an Internet of Things (IoT) device and the application server is an IoT application server associated with the client device.

13. The WLAN router apparatus of claim 12, wherein the performing of the handshake process further comprises generating at least one of a Pairwise Master Key (PMK), a Pairwise Transient Key (PTK), or a Message Integrity Code (MIC) in a secure hardware environment of the WLAN router.

14. The WLAN router apparatus of claim 12, wherein the performing of the handshake process further comprises generating at least one of a Pairwise Master Key (PMK), a Pairwise Transient Key (PTK), or a Message Integrity Code (MIC) at a server that manages the WLAN router, the server being remote from the WLAN router.

15. The WLAN router apparatus of claim 12, wherein the processor is further to allow the client device to join the WLAN based on a default WLAN passphrase.

16. A non-transitory computer-readable medium comprising code which, when executed by a processor, causes the processor to perform a method comprising:

performing a handshake process with a client device, wherein a media access control (MAC) address associated with the client device is determined based on the handshake process;

determining a MAC address-bound wireless local area network (WLAN) passphrase for the client device based on the MAC address associated with the client device, wherein the MAC address-bound WLAN passphrase is stored in a secure storage of a WLAN router, the secure storage being implemented with secure storage hardware;

determining whether the client device is in possession of the MAC address-bound WLAN passphrase for the client device based on the handshake process;

allowing the client device to join the WLAN in response to a determination that the client device is in possession of the MAC address-bound WLAN passphrase for the client device;

determining a type of the client device based on the MAC address associated with the client device;

receiving an access control rule for the client device determined based on the determined type of the client device from a remote router management server;

associating the access control rule for the client device with the WLAN passphrase for the client device;

applying the access control rule at the WLAN router to filter communications of the client device, wherein the access control rule limits communication partners of the client device to a limited number of devices related to intended functions of the client device, and wherein the access control rule is determined at the remote router management server based on the determined type of the client device; and enabling an encryptor/decryptor function for the client device at the WLAN router, the encryptor/decryptor function comprising encrypting at the WLAN router transmission from the client device to an application server, and decrypting at the WLAN router transmission from the application server to the client device, wherein the application server is configured to decrypt the transmission from the client device to the application server that is encrypted by the WLAN router and to encrypt the transmission from the application server to the client device that is decryptable by the WLAN router, and wherein the client device is an Internet of Things (IoT) device and the application server is an IoT application server associated with the client device.

17. The non-transitory computer-readable medium of claim 16, wherein the code for performing the handshake process further comprises code for generating at least one of a Pairwise Master Key (PMK), a Pairwise Transient Key (PTK), or a Message Integrity Code (MIC) in a secure hardware environment of a WLAN router.

18. The non-transitory computer-readable medium of claim 16, wherein the code for performing the handshake process further comprises code for generating at least one of a Pairwise Master Key (PMK), a Pairwise Transient Key (PTK), or a Message Integrity Code (MIC) at a server remote from a WLAN router managed by the server.

19. The non-transitory computer-readable medium of claim 16, further comprising code for allowing the client device to join the WLAN based on a default WLAN passphrase.

* * * * *